US007971695B2

(12) United States Patent
Vaughn et al.

(10) Patent No.: US 7,971,695 B2
(45) Date of Patent: Jul. 5, 2011

(54) INDEPENDENT VARIABLE DRIVE ASSEMBLIES FOR WHEELS ON A SNOWBLOWER AND RELATED METHODS

(75) Inventors: Christopher W. Vaughn, Mebane, NC (US); Jeffrey A. Wians, Mebane, NC (US); Christopher M. Osborne, Efland, NC (US)

(73) Assignee: Honda Motor Co., Ltd., Tokyo (JP)

( * ) Notice: Subject to any disclaimer, the term of this patent is extended or adjusted under 35 U.S.C. 154(b) by 729 days.

(21) Appl. No.: 11/961,370

(22) Filed: Dec. 20, 2007

(65) Prior Publication Data

US 2009/0159392 A1 Jun. 25, 2009

(51) Int. Cl.
*F16D 67/02* (2006.01)
(52) U.S. Cl. ......... 192/13 R; 37/257; 192/14; 192/18 R; 192/49
(58) Field of Classification Search .................... 37/257; 476/30, 69
See application file for complete search history.

(56) References Cited

U.S. PATENT DOCUMENTS

| 3,680,669 | A | * | 8/1972 | Hansen | 192/18 R |
| 4,457,086 | A | * | 7/1984 | Bacon | 37/257 |
| 4,920,734 | A | | 5/1990 | Wenzel | |
| 5,012,907 | A | * | 5/1991 | Fujioka et al. | 192/13 R |
| 5,018,592 | A | * | 5/1991 | Buchdrucker | 180/19.3 |
| 5,020,308 | A | | 6/1991 | Braun et al. | |
| 5,617,764 | A | * | 4/1997 | Komura et al. | 74/606 R |
| 6,341,479 | B1 | | 1/2002 | Scag et al. | |
| 6,464,055 | B1 | | 10/2002 | Wians | |
| 6,968,933 | B2 | | 11/2005 | Buckhouse et al. | |
| 2003/0154632 | A1 | | 8/2003 | Dowe et al. | |
| 2006/0150444 | A1 | | 7/2006 | Friberg et al. | |

* cited by examiner

*Primary Examiner* — Rodney H Bonck
(74) *Attorney, Agent, or Firm* — Jenkins, Wilson, Taylor & Hunt, P.A.

(57) ABSTRACT

Drive assemblies and related methods are provided particularly suited for a snowblower. The drive assemblies include a transmission wheel disposed about a shaft and rotatably movable for rotating at least one wheel. The transmission wheel has a contact surface. The drive assemblies also include a drive pulley having a drive surface. The drive pulley is rotatable and configured for causing the transmission wheel to rotate when the drive surface and the contact surface of the transmission wheel are in contact. At least one brake clutch is disposed about an end of the shaft to provide independent control to the at least one wheel.

20 Claims, 12 Drawing Sheets

INDEPENDENT VARIABLE DRIVE ASSEMBLIES FOR WHEELS ON A SNOWBLOWER AND RELATED METHODS

TECHNICAL FIELD

The subject matter described herein relates generally to drive assemblies. More particularly, the subject matter disclosed herein relates to drive assemblies and methods for power equipment, particularly suitable for a snowblower to permit independent control of both wheels of a snowblower to turn the snowblower during operation.

BACKGROUND

Due to the depth of the snow in which snowblowers are usually used, many snowblowers are self-propelled. Snowblowers can be hard to manipulate within deep snow because of the weight of the machinery. The deeper the snow is, the harder it can be to maneuver the snowblower. Self-propelled snowblowers allow advancement and regression of the snowblower at least partially under the power generated by its engine. Self-propelled snowblowers can be relatively easy to use as compared to non-self-propelled snowblowers. Through the use of self-propelled mechanisms on snowblowers, a user can devote relatively less energy in advancing the snowblower forward and concentrate more energy on steering.

Typically, self-propelled snowblowers have an engine, a pair of drive wheels, an auger, and a discharge chute. The engine provides power to all power-requiring components of the snowblower, which include the drive wheels and the auger. A typical method used to transfer power from the engine to the wheels is using a friction drive or a chain drive. For either the chain drive or the friction drive, a user can engage the drive by, for example, depressing a drive lever located on the handlebar of the snowblower.

To turn the snowblower when the self-propelled drive of the snowblower is activated, the speed of rotation of the individual wheels can be changed. For example, the use of two clutches, one associated with each wheel of a two wheel snowblower, can be selectively operated by a pivoting control on the handle so as to allow for power steering of the snowblower. The drive system of such a snowblower can include an engine, a snowblower clutch, a drive clutch, and a final drive including two independent wheel clutches. The final drive can have left and right wheel clutches intermediate an input gear and the left and right wheels. The input gear can be engaged by a chain. The wheel clutches can be engaged such that the wheels are driven by the chain. Left and right controls can be used to engage and disengage the respective clutches. For example, upon movement of a control for the left side, the left wheel clutch can be disengaged. Since at this time, power will only be applied to the right wheel, the snowblower will turn left on forward motion. On return of the control from the left to its neutral position, the left wheel clutch is again engaged and the snowblower returns to movement in a straight direction. With the clutches, the wheels can still rotate after disengagement of the respective clutch, thereby widening the turn.

In other self-propelled snowblowers, individual brakes can be used to turn the snowblower. An individual brake can be associated with each wheel of a two wheel snowblower. The brakes can be selectively operated to stop rotation of the associated wheel to cause that wheel to stop and the snowblower to turn in the direction of the stopped wheel. With the brakes, the drive system still tries to drive the wheels even after engagement of the respective brake. This makes braking harder and can widen the turn.

Therefore, an improved drive assembly for both of the driven wheels is provided that can both brake and clutch the respective wheels to provide independent control of both wheels of a snowblower to turn the snowblower during operation.

SUMMARY

In accordance with this disclosure, novel drive assemblies and methods are provided. It is therefore an object of the present disclosure to provide novel drive assemblies and methods that provide independent control of both wheels of a snowblower to turn the snowblower during operation. This and other objects as may become apparent from the present disclosure are achieved, at least in whole or in part, by the subject matter described herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
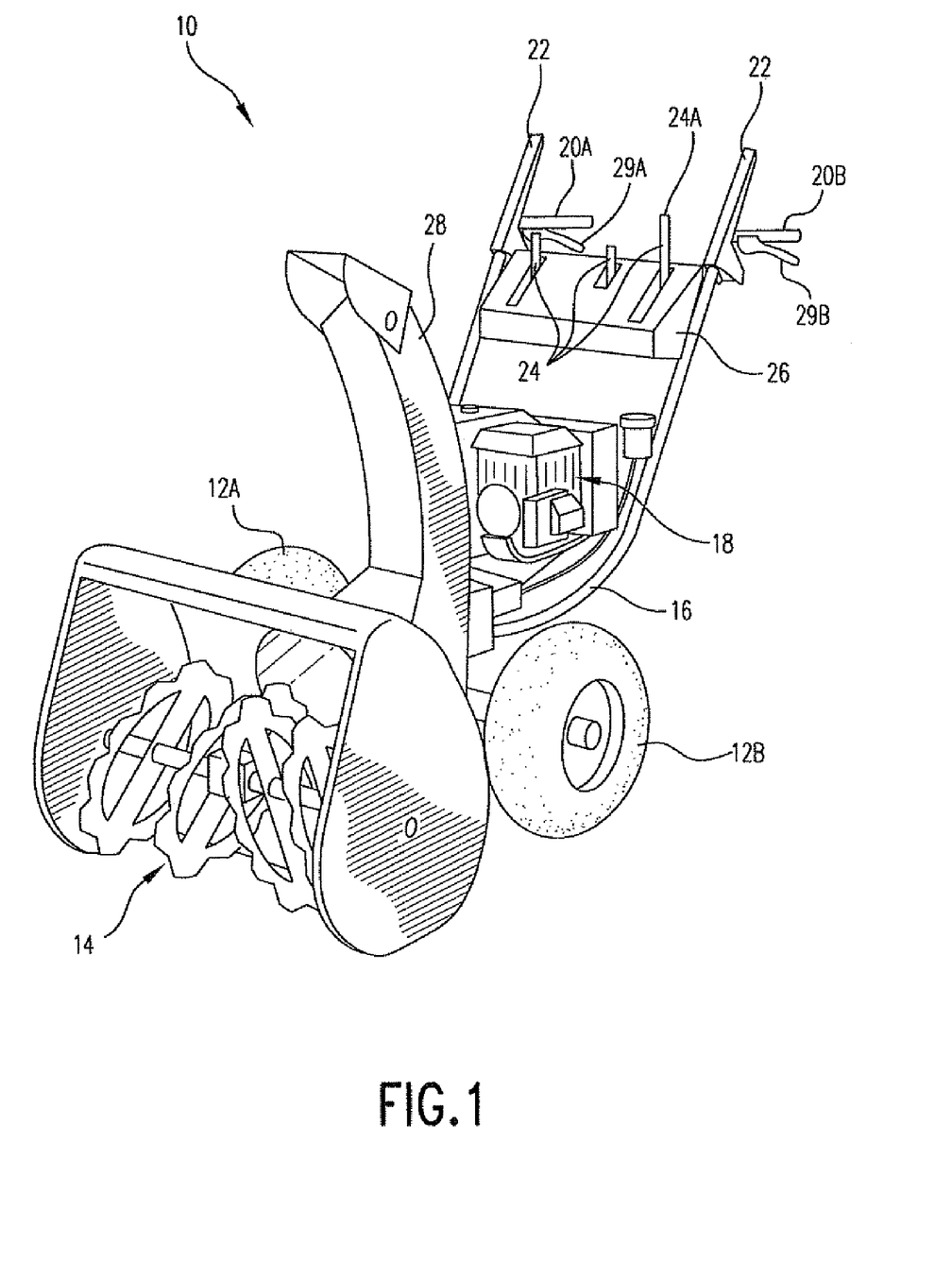
FIG. 1 illustrates a perspective view of an embodiment of a snowblower according to the present subject matter.

FIG. 1 illustrates a power equipment device shown in one aspect as a snowblower, generally designated 10, which can use a drive assembly to provide power to one or both wheels 12A and 12B of snowblower 10. It is envisioned that the present disclosure could be used in association with other types of power equipment devices also. Wheels 12A, 12B of snowblower 10 can include tires or tracks that can be used to contact the surface over which snowblower 10 travels. Snowblower 10 can have a snow collecting and feeding auger 14 mounted on a frame 16 supported by the pair of wheels by which snowblower 10 is propelled over the ground under the power an engine generally designated 18. Frame 16 can include steering handles 20A and 20B which can provide operator presence controllers 22 and drive controllers 24 for controlling the speed of the engine, wheels, and auger on a control panel 26. For example, controller 24A can be provided to control the speed and direction of drive assembly of the wheels. Control panel 26 can be provided between handles 20A, 20B and can also provide other control mechanisms. Snowblower 10 can include a discharge chute 28 through which snow collected by the auger 14 can be shot outwardly.

Snowblower 10 can also include brake clutch controls, such as levers 29A and 29B secured to a bottom side of the respective steering handles 20A, 20B. Such brake clutch levers 29A, 29B can operate brake clutches associated with the respective wheels 12A, 12B to control the rotation of the respective wheels 12A, 12B to facilitate steering of the snowblower 10. For example, brake clutch lever 29A can be used to control the rotation of right wheel 12A, while brake clutch lever 29B can be used to control the rotation of left wheel 12B.

In use, controller 24A and the brake clutch levers 29A, 29B can be used to steer the snowblower 10 to the left or right. The controller 24A can be used to control the speed and direction of drive assembly of the snowblower 10. For example, controller 24A can be used to move the snowblower both forward and backward and can be used to vary the speed in either direction. Once the speed and direction of the snowblower 10 is set, each individual brake clutch lever 29A, 29B can be used to activate the associated brake clutch to turn snowblower in different directions by slowing or stopping the rotation of the respective wheel 12A, 12B associated therewith. The details of such operations will be described in more detail below.

Figure 2A:
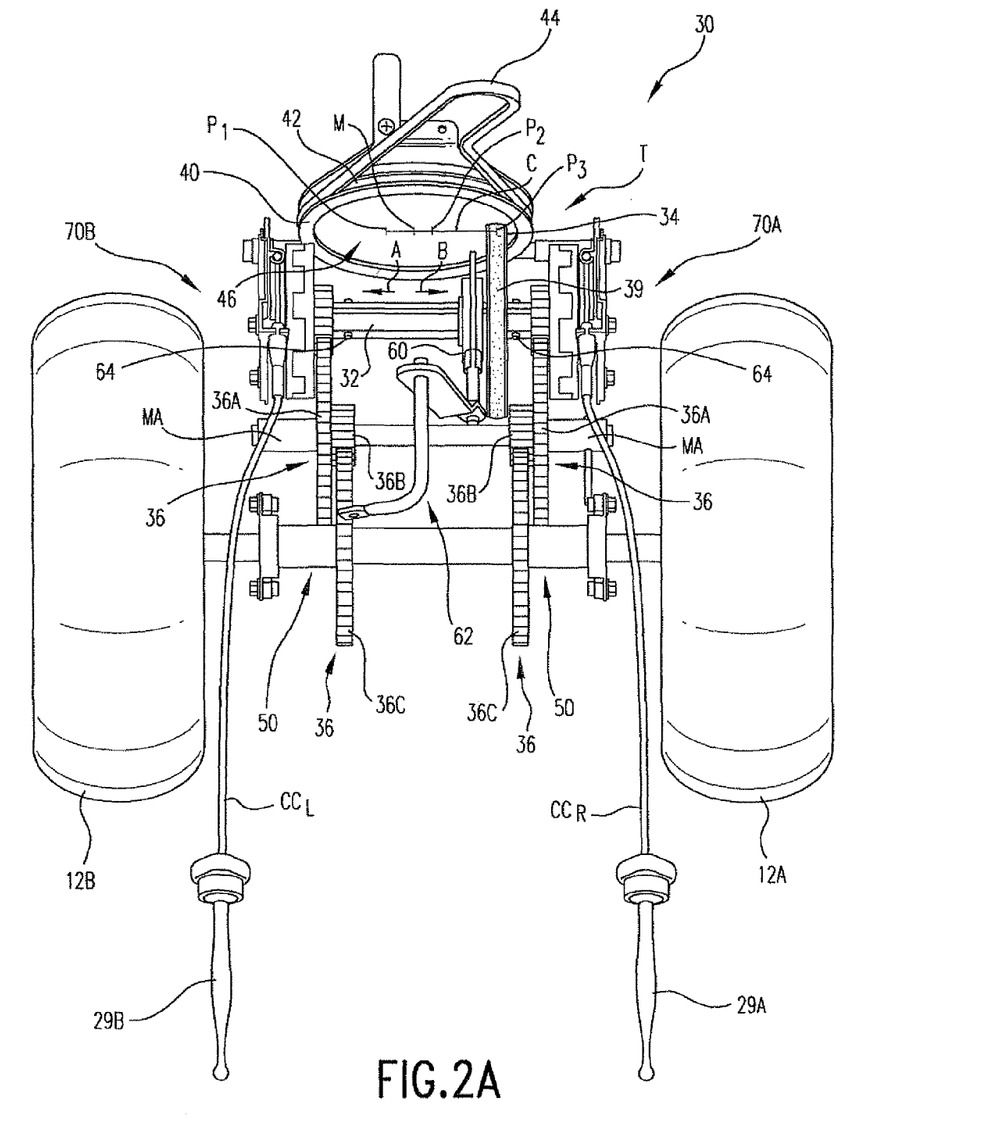
FIG. 2A illustrates a top perspective view of the embodiment of the drive assembly according to FIG. 1.
Figure 2B:
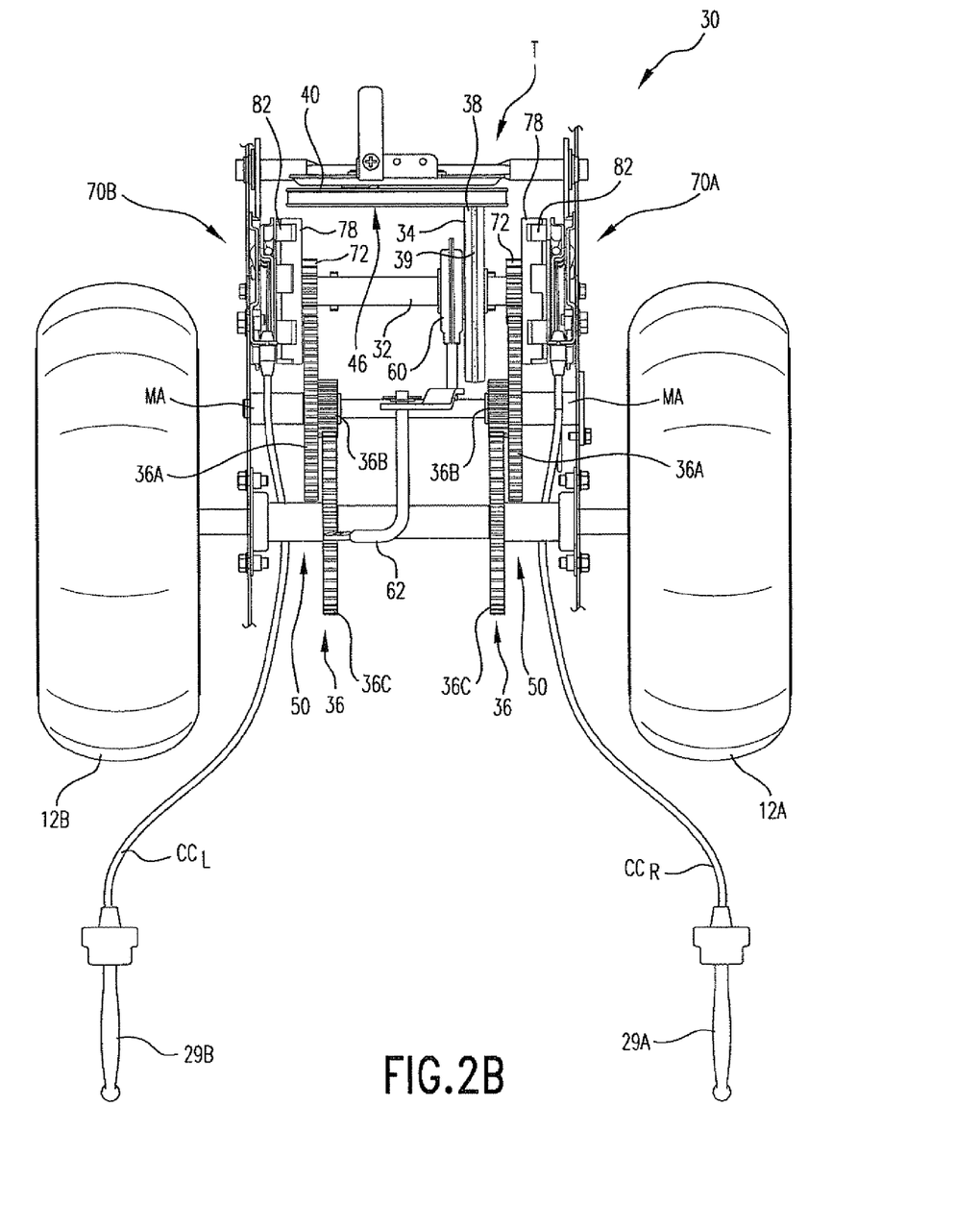
FIG. 2B illustrates a top plan view of the embodiment of the drive assembly according to FIG. 1.
Figure 3:
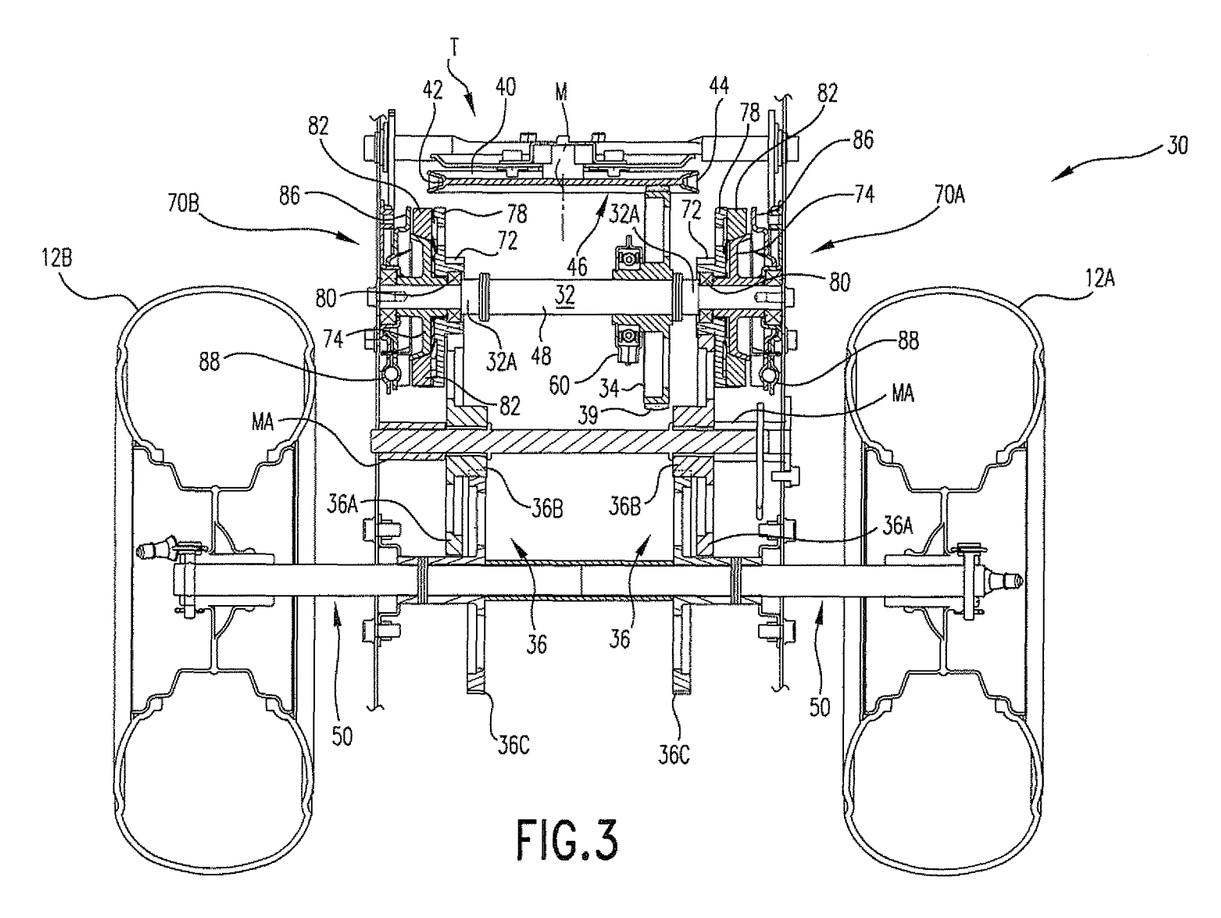
FIG. 3 illustrates a cross-sectional view of the embodiment of the drive assembly according to FIG. 1.

FIGS. 2A, 2B, and 3 illustrate a drive assembly generally designated 30 used to drive wheels 12A and 12B of the snowblower 10. Drive assembly 30 can include a transmission system T that can receive torque from a suitable prime mover or motor (not shown), such as an electric motor or an internal combustion engine, through a suitable torque transferring means such as a belt or shaft or the like. Transmission system T can have any configuration suitable for transferring torque from the motor (not shown) to for example a drive shaft 32. For example, a direct drive transmission system, a standard gear transmission, or any suitable transmission can be used. Accordingly, in some embodiments, transmission system T can be a variable-speed transmission, and particularly a continuously variable-speed transmission. In the embodiment shown in the figures, transmission system T provides a continuously variable transmission ("CVT") system for turning drive shaft 32 that drives axles generally designated 50 on which wheels 12A, 12B of snowblower 10 are attached through gearing, i.e., a series of gears, generally designated 36. Transmission system T can include at least one transmission wheel 34 that can have an aperture centrally located about its axis through which drive shaft 32 passes. Drive shaft 32 is in independent driving communication with the axles 50 to which the wheels 12A, 12B are secured. Transmission system T can also include a drive pulley 40 that is driven by the motor. Transmission wheel 34 can include an outer circumference 38 which has a contact surface 39 that contacts a drive pulley 40.

Drive pulley 40 of drive assembly 30 can have a v-shaped outer circumference 42 in which a drive belt 44 can reside. Drive belt 44 can be driven by engine 18. The engine can transfer the power to belt 44 which transfers the power to drive pulley 40. Thereby, drive pulley 40 can be continuously driven while engine 18 is running. Drive pulley 40 can include a drive surface 46 on which contact surface 39 on the outer circumference 38 of transmission wheel 34 runs when transmission wheel 34 is in contact with drive pulley 40. Transmission wheel 34 can be moved along drive pulley 40 to increase and decrease the speed at which drive shaft 32 and wheels 12 of the snowblower are rotated. Further, transmission wheel 34 can be positioned against drive pulley 40 so as to reverse the direction of rotation of wheels 12 of the snowblower as will be described in more detail below.

Variability of the transmission ratio can be accomplished by moving transmission wheel 34 along drive surface 46 of drive pulley 40. Transmission wheel 34 can be coupled to the drive shaft 32 such that the rotational movement of transmission wheel 34 causes rotational movement of drive shaft 32. As transmission wheel 34 is rotated by the contact between contact surface 39 and drive surface 46 of drive pulley 40, transmission wheel 34 rotates drive shaft 32 that can indirectly drive an axle (or axles) on which the wheels of the snowblower can reside. Drive shaft 32 can have an outer surface 48 that can be cylindrical or at least mostly or substantially cylindrical in shape. Alternatively, drive shaft 32 can have a cross-sectional shape that can be rectangular, hexagonal, octagonal, or the like. Further, drive shaft 32 can have a non-symmetrical cross-section. Transmission wheel 34 can be moved along drive shaft 32 by an engager 60 which is in communication and can be controlled by controller 24A (FIG. 1) through a linking mechanism 62.

Transmission wheel 34 can include an axial bearing at its core that can engage outer surface 48 of drive shaft 32. The axial bearing can permit transmission wheel 34 to move along drive shaft 32 in lateral directions A and B to vary the transmission ratio within drive assembly 30. At the same time, the axial bearing can engage drive shaft 32 so as to transfer the torque created by the engagement of transmission wheel 34 to the drive pulley 40 from transmission wheel 34 to drive shaft 32. The axial bearing can be integral to transmission wheel 34.

Outer surface 48 of drive shaft 32 can be greased to allow movement of transmission wheel 34 along drive shaft 32. Contact surface 39 can therefore move along drive surface 46 of the drive pulley 40. This movement along drive surface 46 will vary the speed at which the axles of the wheels of the snowblower will turn. Further, transmission wheel 34 can include an axial bearing at its core that can engage drive shaft 32.

Drive pulley 40 rotates about an axis M. Transmission wheel 34 can travel along a centerline C on drive pulley 40. Centerline C can intercept and run perpendicular to axis M of drive pulley 40. Different points along centerline C have been identified to illustrate the operation of the variable drive assembly. When transmission wheel 34 is positioned by engager 60 along drive shaft 32 on the left side of axis M of drive pulley 40, for example, at point $P_1$ shown in FIG. 2A, drive pulley 40 rotates transmission wheel 34 in a reverse direction so that drive shaft 32 is rotated in reverse as well. This rotation causes gearing 36 to rotate axles 50 on which wheels 12A; 12B of snowblower 10 can be secured such that wheels 12A, 12B rotate in a reverse direction. When transmission wheel 34 is positioned by engager 60 along drive shaft 32 on the right side of axis M of drive pulley 40, for example, at point $P_2$, transmission wheel 34 is in a position on the right side of axis M of drive pulley 40. In this position, transmission wheel 34 rotates in a forward direction as compared to rotation of the transmission wheel 34 when at point $P_1$. As transmission wheel 34 rotates in a forward direction, drive shaft 32 through the bearing connection rotates drive shaft 32 in a forward direction. The rotation of drive shaft 32, in turn, rotates gears 36 in the forward direction so that the axles 50 and wheels 12A, 12B to which they are attached also rotate in the forward direction.

When transmission wheel 34 is positioned by engager 60 along drive shaft 32 on the right side of axis M of drive pulley 40, for example, at point $P_3$, transmission wheel 34 is in a position further on the right side of axis M of drive pulley 40. In this position, transmission wheel 34 rotates in a forward direction at faster speed as compared to rotation of the transmission wheel 34 when at point $P_2$. Drive shaft 32 can include stops 64 on either end that limit the amount of movement of transmission wheel 34 along the drive shaft 32 and, in turn, along centerline C of drive pulley 40. By moving transmission wheel 34 along drive shaft 32 and centerline C of drive pulley 40 among the different points on centerline C such as points $P_1$, $P_2$, and $P_3$ between stops 64, the transmission ratio can be continuously varied therebetween.

As transmission wheel 34 moves from point $P_3$ toward axis M of drive pulley 40, the speed of rotation of drive shaft 32 and thus axles 50 is slowed. Once transmission wheel 34 passes axis M of drive pulley 40, drive shaft 32 will turn in the opposite (reverse) direction. By using the bearing system to couple transmission wheel 34 to drive shaft 32 while permitting transmission wheel 34 to laterally move along drive shaft 32 as described above, a continuous variable transmission system is provided.

To control the rotation of the individual wheels 12A, 12B, respective brake clutches generally designated 70A and 70B can be individually activated by their corresponding brake clutch levers 29A and 29B. Brake clutch 70A can be disposed on a right end of drive shaft 32 and brake clutch 70B can be disposed on a left end of drive shaft 32. Each brake clutch 70A, 70B can include a drive gear 72 that engages a corresponding gearing 36 for the associated wheel 12A, 12B. Brake clutches 70A, 70B with corresponding drive gears 72 and gearings 36 facilitate the forward and reverse movement of snowblower 10 through the driving of individual wheels 12A, 12B.

Gearings 36 provide a gearing ratio that sufficiently slows the rotation transferred from the motor to drive pulley 40 by belt 44 to a rotational speed of wheels 12A 12B that permits snowblower 10 to progress at varying walking paces for the user. For example, each drive gear 72 can be a smaller sized gear that interacts with a large gear 36A disposed about a corresponding intermediate shaft MA such that each drive gear 72 turns its corresponding gear 36A and the intermediate shaft to which the specific gear 36A is secured. Since gears 36A are larger than drive gears 72, the rotation of each intermediate shaft MA can be slower than that of drive shaft 32. Disposed beside each gear 36A on the corresponding intermediate shaft MA is a smaller gear 36B. Thus, as each intermediate shaft MA is turned by its corresponding larger gear 36A, the corresponding smaller gear 36 is turned at the slower speed of the intermediate shaft MA.

Each smaller gear 36B engages a larger gear 36C that is disposed on a corresponding axle 50 on which the respective left and right wheels 12A, 12B are attached. Since larger gears 36C are larger than smaller gears 36B, larger gears 36C are rotated at a slower rotational speed than the smaller gears 36B are rotated. The corresponding axles 50 and their associated wheels 12A, 12B can be rotated at the slower speeds of the associated larger gears 36C. In this manner, axles 50 can turn at a slower speed than intermediate shafts MA and much slower than drive shaft 32. The rotational speed at which drive pulley 40 is driven is reduced to manageable rotational speeds of wheels 12A, 12B for the user of snowblower. Consequently, wheels 12A, 12B can be rotated at appropriate speeds to permit a user to walk behind and control snowblower 10 without overexertion.

As described above, brake clutches 70A, 70B control the rotation of the respective wheels 12A, 12B. Brake clutches 70A, 70B are normally in engaged positions so that drive gears 72 rotate and wheels 12A, 12B are driven. When one of the brake clutch levers 29A, 29B is activated by the user, the corresponding brake clutch 70A, 70B is disengaged so that the associated wheel 12A, 12B is not rotated. This causes the snowblower to turn in the direct of the stopped wheel 12A, 12B as the other wheel continues to rotate and drive snowblower 10.

FIGS. 3-7 illustrate the components of brake clutches 70A, 70B. In particular, FIGS. 4A and 4B shows a detailed cross-sectional view of brake clutch 70A. Brake clutches 70A, 70B can reside on small diameter portions 32A at the ends of drive shaft 32. Each brake clutch 70A, 70B can include a drive hub 74 fixed by a key 76 (see FIGS. 4A and 4B) to the corresponding drive shaft 32 in a conventional manner. Each brake clutch 70A, 70B also can include a driven member 78 that can be integral with drive gear 72. Bearing assemblies 80 mount the driven members 78 and drive gears 72 on the drive shaft 32. Bearing assemblies 80 can be axially restrained on drive shaft 32 between drive hubs 74 and the edges of drive shaft 32 at portions 32A. Bearing assemblies 80 permit the drive shaft 32 to rotate relative to the driven members 78 and drive gears 72, as will be discussed later.

Figure 4A:
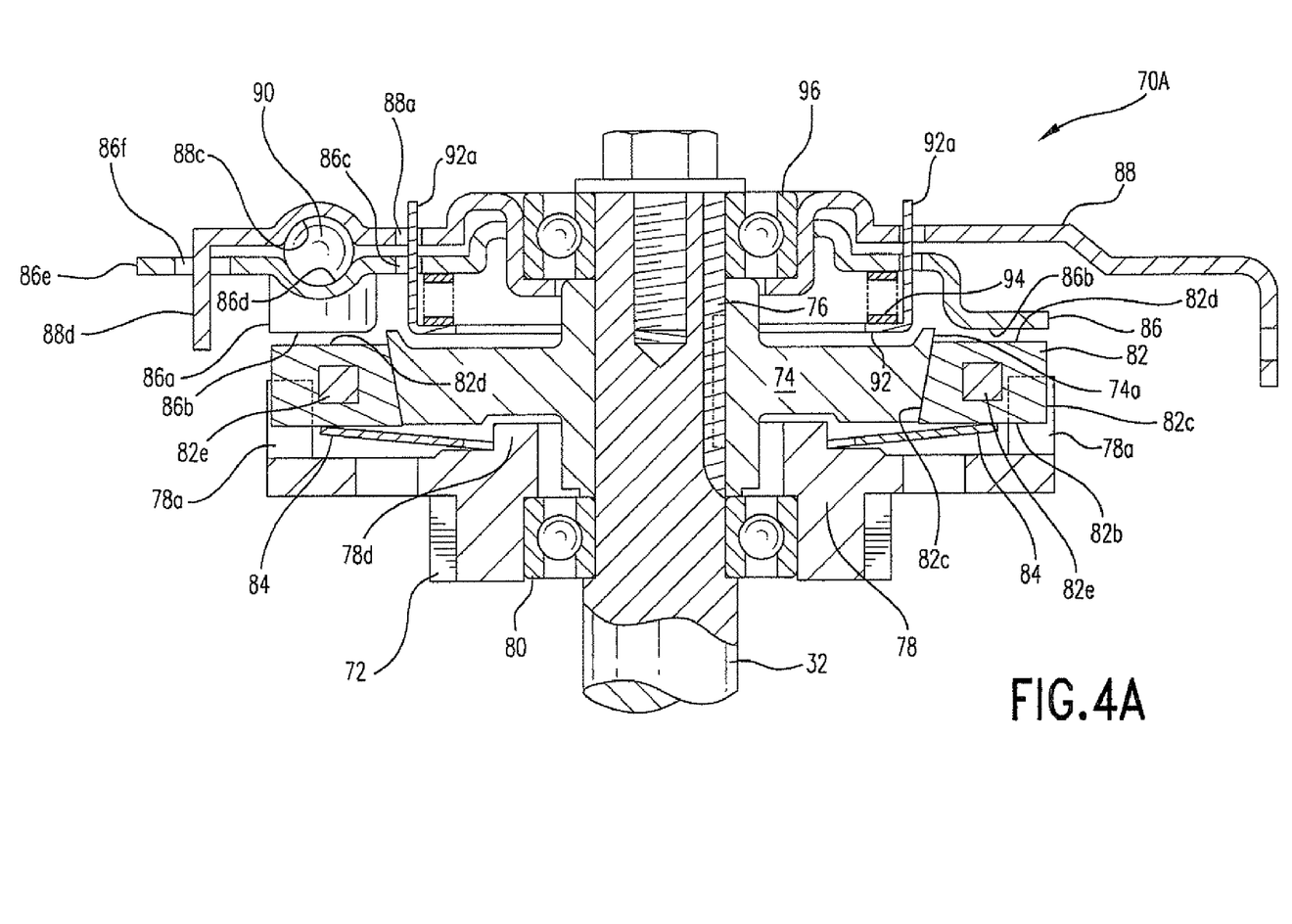
FIG. 4A illustrates a cross-sectional view of the embodiment of a brake clutch used in the drive assembly according to FIGS. 2A, 2B, and 3 with the brake clutch in a disengaged or non-braked position.
Figure 4B:
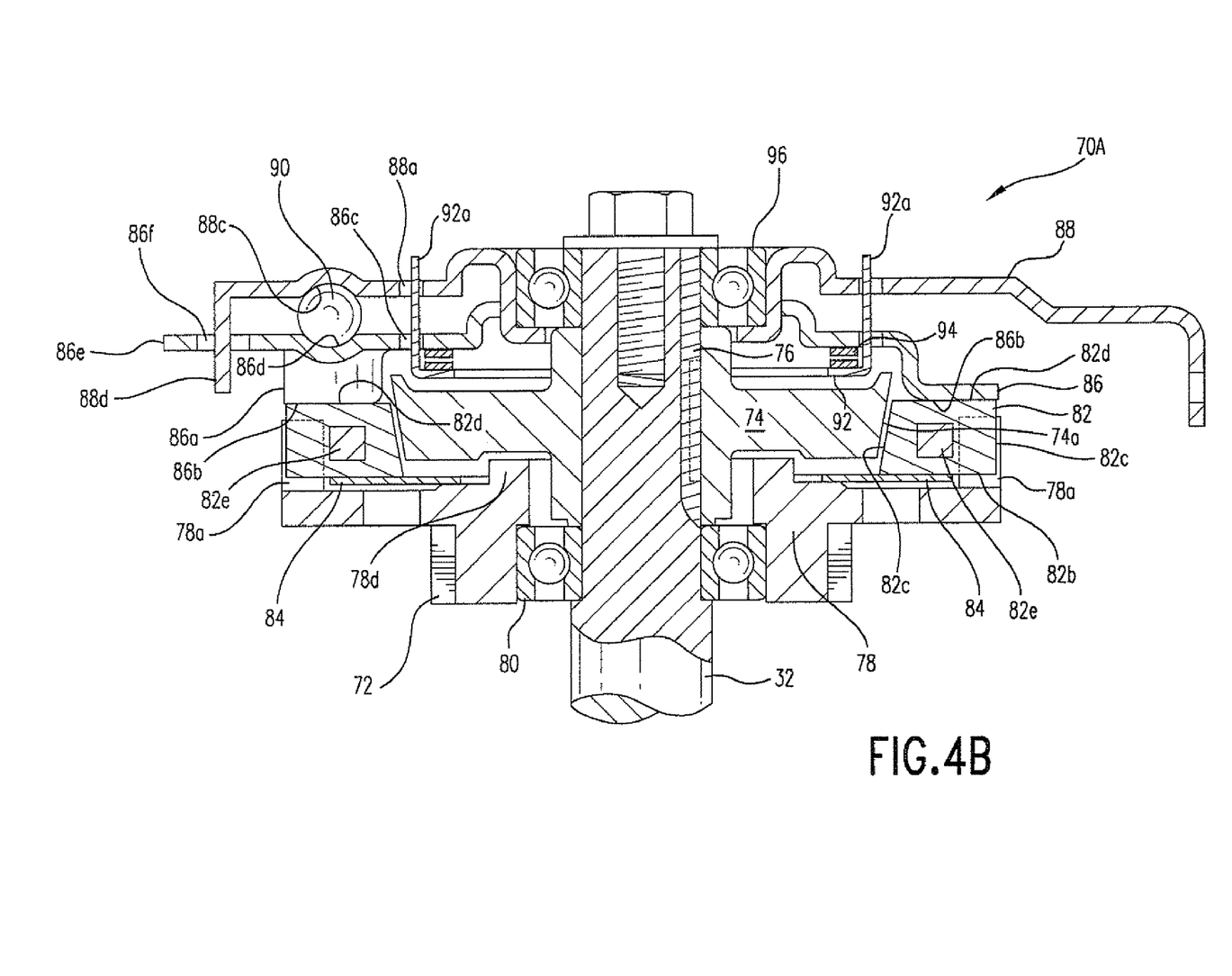
FIG. 4B illustrates a cross-sectional view of the embodiment of a brake clutch used in the drive assembly according to FIGS. 2A, 2B, and 3 with the brake clutch in an engaged or braked position.

Alternatively, drive hubs 74 can be secured to the drive shaft 32 by other mechanical connections such as a built-in key, a tongue and groove, splines or a snap ring. Drive hubs 74 can also be integrally formed with the drive shaft 32. Bearing assemblies 80 can be secured by a press-fit or staking it to either one or both of the drive shaft 32 and the driven members 78 or other similar means can be used.

Each driven member 78 can be annular and have a plurality of projections 78a spaced along its circumference. These projections 78a can extend axially from an upper face 78b of the associated driven member 78. Axial projections 78a adjacent one another can define a space 78c between them. Each driven member 78 can be axially located on the associated bearing assembly 80 by an annular flange 78d. Alternatively, a washer or other similar means can position each driven member 78 on each bearing assembly 80. A plurality of through holes 78e (FIG. 5B) can be provided in the driven member 78 to facilitate removal of any debris, such as snow and dirt. A stopper 78g (FIG. 5B) can be provided on the upper surface 78b of each driven member 78 in at least one of the spaces 78c. This stopper 78g can be configured as a rib or other suitable shape.

Figure 5A:
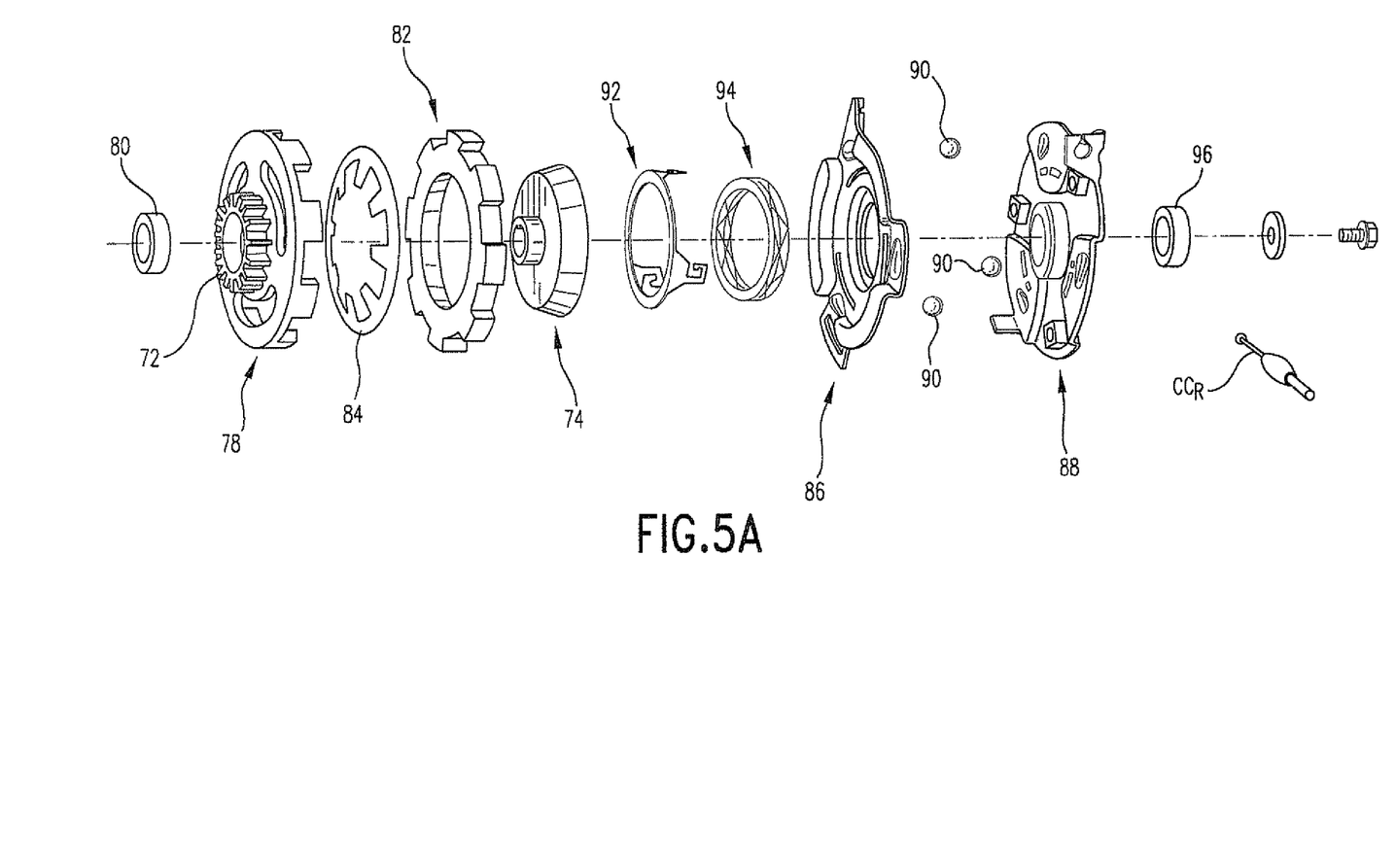
FIG. 5A illustrates an exploded perspective view of the embodiment of the brake clutch of a drive assembly according to FIG. 1.
Figure 5B:
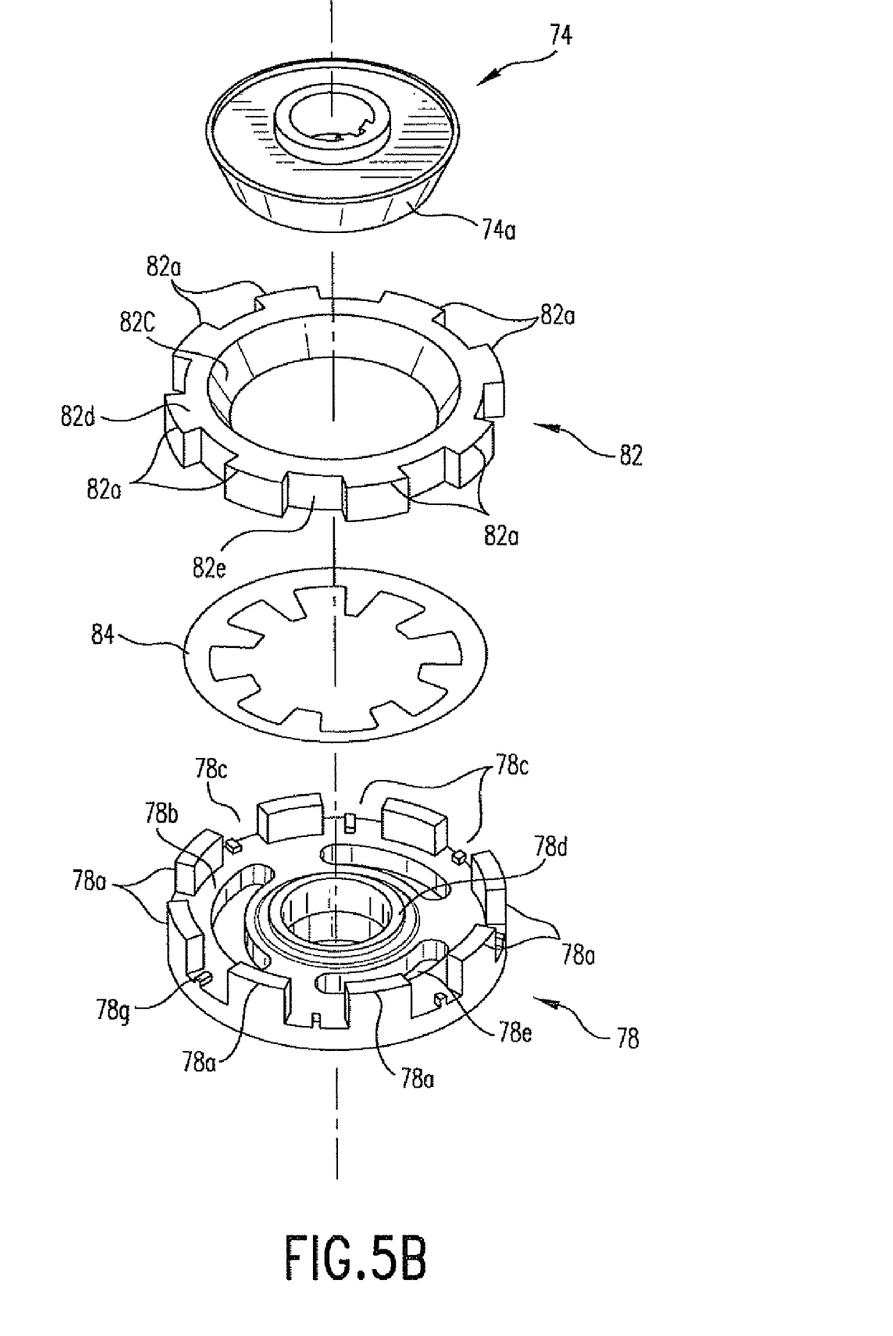
FIG. 5B illustrates an exploded perspective view of the embodiment of a first portion of the brake clutch of a drive assembly according to FIG. 5A.
Figure 5C:
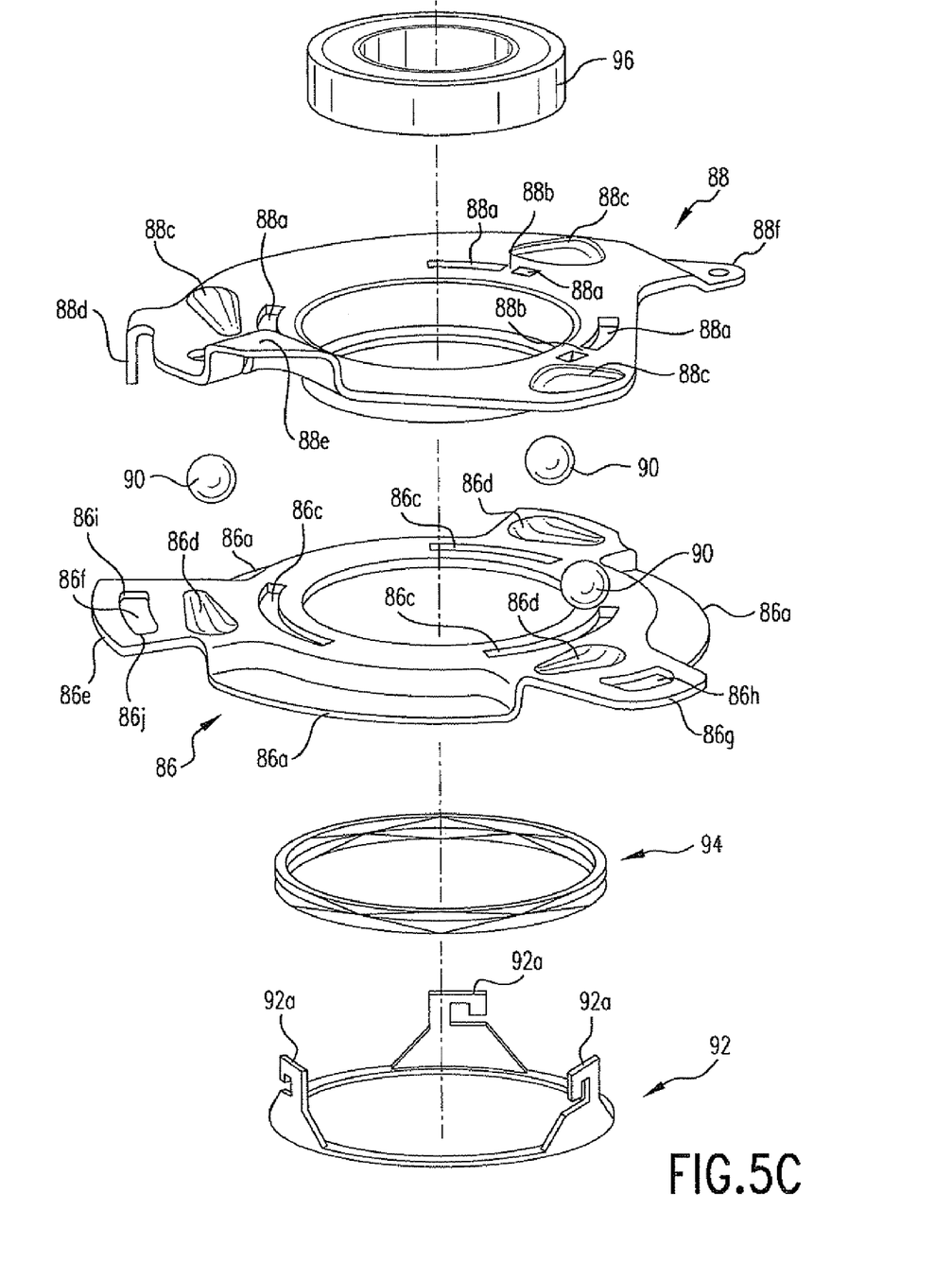
FIG. 5C illustrates an exploded perspective view of the embodiment of a second portion of the brake clutch of a drive assembly according to FIG. 5A.

As seen in FIGS. 5A-5C, each brake clutch 70A, 70B can include a friction member 82, a Belleville spring 84, a brake member 86, a brake actuator 88, a plurality of balls 90, a retainer 92 and a compression spring 94. The compression spring 94 can be configured to be compressible to a very small axial thickness. One or more compression springs 94 can be used in a brake clutch 70A, 70B. By using one compression spring, however, a compact assembly can be used that minimizes the number of parts.

Each brake clutch 70A can be configured to simultaneously displace the brake member 86 and the friction member 82 between respective engaged and disengaged positions, as will be discussed in more detail. FIG. 4A represents brake clutch 70A in an engaged position and FIG. 4B represents the brake clutch 70A in a disengaged position.

As seen in FIGS. 4A, 4B, and 5B, each friction member 82 can have a plurality of radially extending projections 82a spaced along its circumference. Each radial projection 82a can extend into a corresponding one of the spaces 78c and can abut the two adjacent axial projections 78a. The axial projections 78a and the radial projections 82a can rotationally secure each friction member 82 to the associated driven member 78. Each friction member 82 can be a one-piece element which can be a composite including rubber, brass and graphite.

Friction members 82 can have a powder metal core 82e for reinforcement. The powder metal core 82e can be provided with surface ridges to rotationally lock the powder metal core 82e within the associated friction member 82. While the powder metal core 82e adds strength to its associated friction member 82, friction member 82 can function without it.

Each Belleville spring 84 contacts both the upper face 78b of its associated driven member 78 and a lower surface 82b of its associated friction member 82. Each spring 84 biases the associated friction member 82 axially away from the corresponding driven member 78. The interaction of these axial projections 78a and these radial projections 82a can permit the friction member 82 to be axially displaced relative to the driven member 78.

A clutch surface 82c formed on the inner circumference of each friction member 82 can selectively engage a frusto-conical outer surface 74a on the corresponding drive hub 74. Clutch surface 82c can also be frusto-conical. Forming this clutch surface 82c as a frusto-conical surface maximizes surface area with a minimum radial dimension.

Each spring 84 biases the associated clutch surface 82c into contact with the frusto-conical outer surface 74a of the associated drive hub 74. This frictional contact allows the drive hub 74 to drive the associated driven member 78.

A brake surface 82d can be provided on the upper surface of each friction member 82. Brake surface 82d and the clutch surface 82c can be provided on separate (the upper and the inside) surfaces of each friction member 82 to save space and minimize the number of elements needed for each brake clutch 70A, 70B.

As seen in FIGS. 4A, 4B, and 5C, each brake member 86 can have at least one brake shoe 86a, and preferably, a plurality of brake shoes 86a circumferentially spaced about its periphery. The brake shoes 86a can extend axially downward from the bottom of the brake member 86. Each brake shoe 86a can have a braking surface 86b that can selectively engage brake surface 82d on the associated friction member 82.

Brake actuator 88 of each brake clutch 70A, 70B can be coaxially disposed above the associated brake member 86. A bearing assembly 96 can allow the respective brake actuator 88 to be mounted for relative rotation on drive shaft 32. Each bearing assembly 96 can be press fit onto drive shaft 32 and the associated brake actuator 88. Alternatively, each bearing assembly 96 can be retained by staking the bearing assembly 96 to any combination of drive shaft 32, brake actuator 88 and drive hub 74.

Each brake actuator 88 can have a plurality of circumferentially spaced arcuate slots 88a. A rib 88b can extend across a respective one of the arcuate slots 88a as shown in FIG. 5C. A plurality of arcuate slots 86c can be circumferentially spaced on each brake member 86. A portion of each brake member arcuate slot 86c can overlap a corresponding brake actuator arcuate slot 88a with the remainder extending beyond the corresponding brake actuator arcuate slot 88a.

The retainer 92 used in each brake clutch 70A, 70B can be a flat annular disk with a plurality of hooks 92a extending axially upward from the circumference of the retainer 92. Each retainer 92 can be coaxially disposed below the associated brake actuator 88 and radially inside of the associated brake shoes 86a. Each hook 92a can project through arcuate slots 86c and 88b in the associated brake member 86 and the associated brake actuator 88. Each hook 92a can be secured on a respective rib 88b. Each retainer 92 can be coated with a low friction material, such as polytetraflouroethylene (PTFE) or nylon. This low friction coating allows for an easier return of the respective retainer 92 to its neutral position, as described further below.

One or more compression springs 94 are captured between the bottom of each brake member 86 and the upper surface of the associated retainer 92. Each retainer 92 connects the associated brake member 86 to the associated brake actuator 88, and the one or more compression springs 27 biases the associated brake member 86 away from the associated brake actuator 88.

A plurality of ball ramp assemblies can form a connection between each brake member 86 and its associated brake actuator 88 for the respective brake clutches 70A, 70B, Each ball ramp assembly can comprise inclined ball ramp surfaces 86d, 88c formed in each of the respective brake members 86 and brake actuators 88. Ball ramp surfaces 86d oppose ball ramp surfaces 88c and are inclined in the opposite direction relative to the ball ramp surfaces 88c. A ball 90 can be movably captured between each pair of opposed ball ramp surfaces 86d and 88c, respectively.

Figure 6:
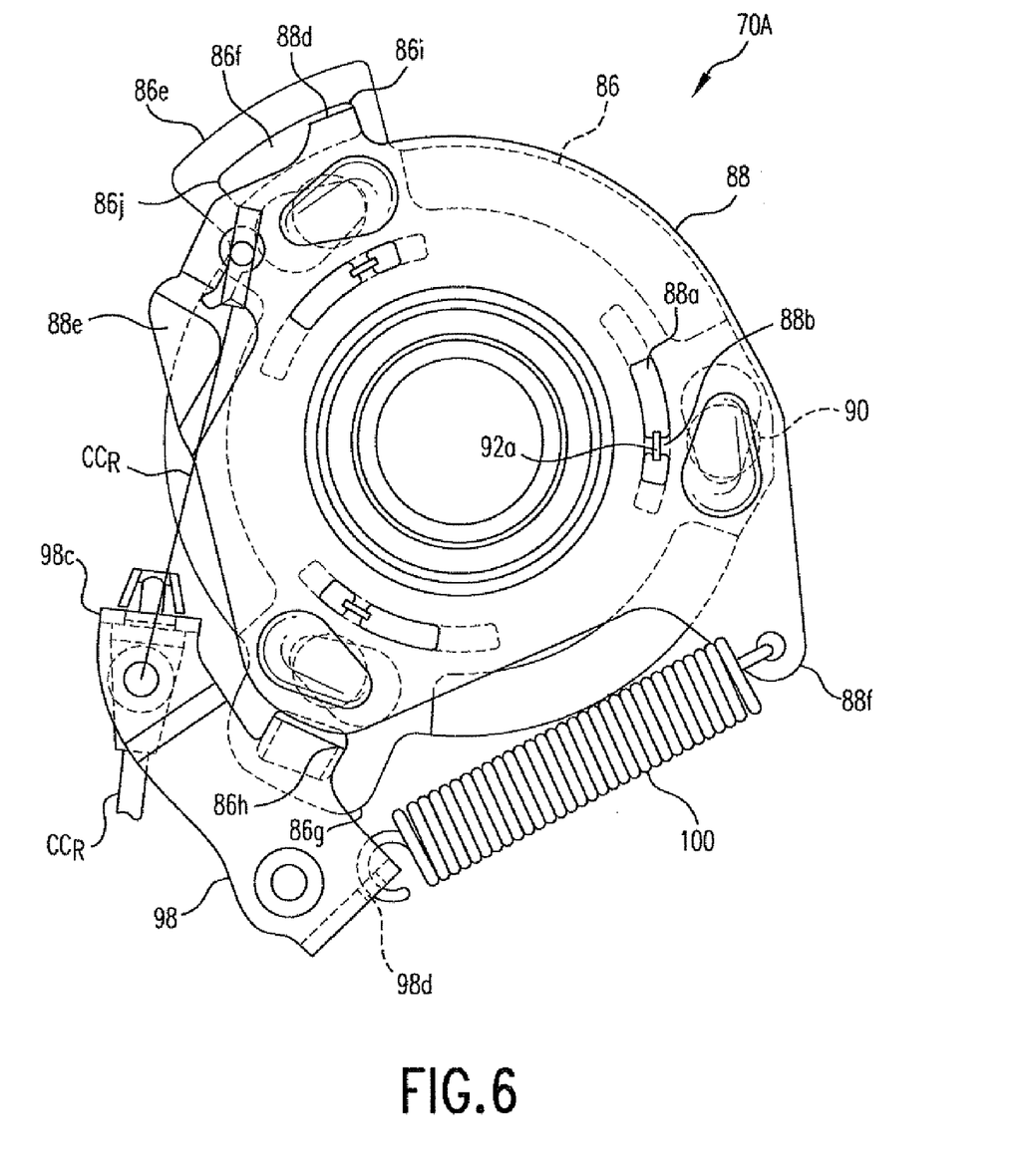
FIG. 6 illustrates an embodiment of a portion of the brake clutch of the embodiment of the drive assembly of FIGS. 2A, 2B and 3 with the brake clutch in a braked position according to FIG. 4B.
Figure 7:
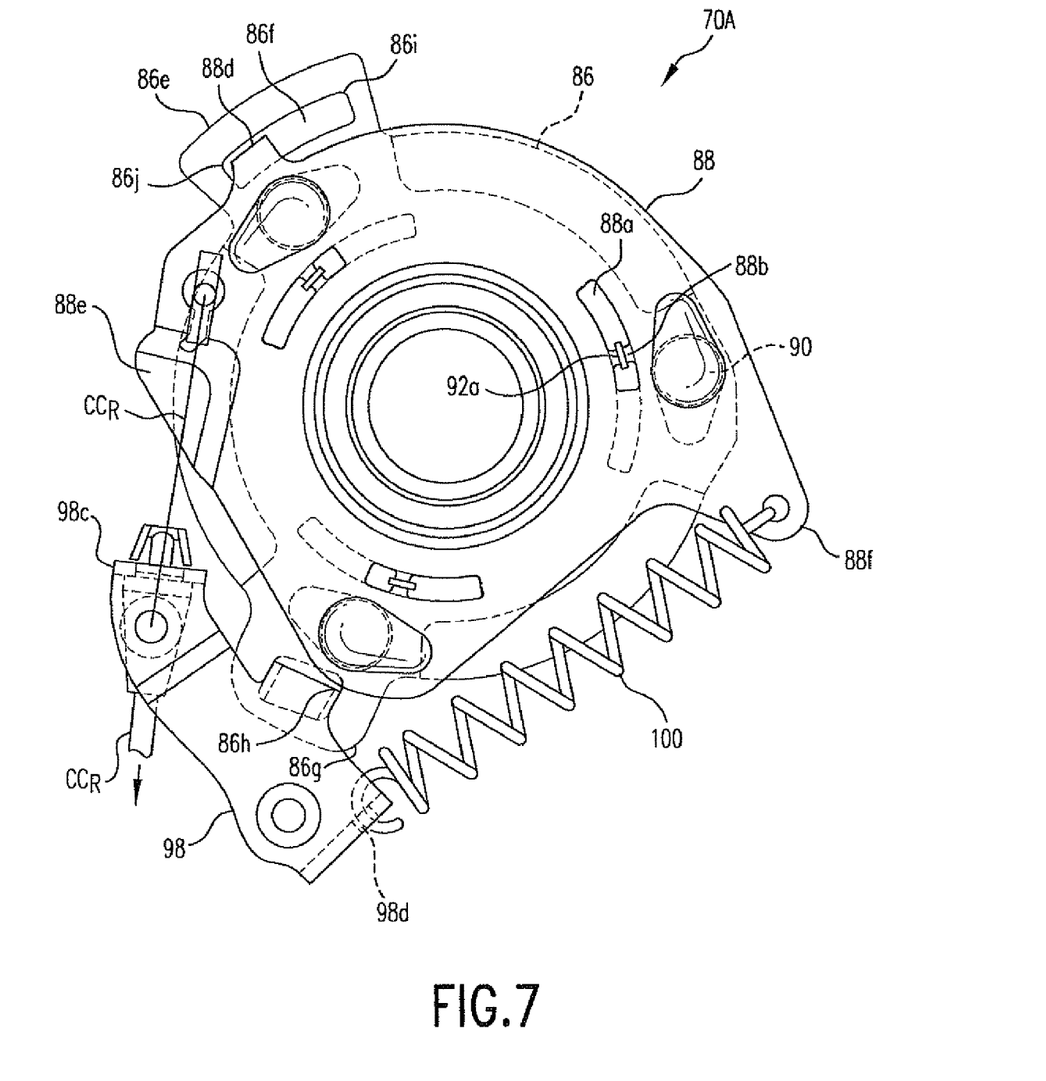
FIG. 7 illustrates an embodiment of a portion of the brake clutch of the embodiment of the drive assembly of FIGS. 2A, 2B, and 3 with the brake clutch in an actuated position according to FIG. 4A.

As an example, three ball ramp surface pairs can be used and located on each brake member 86 and each brake actuator 88 at points that form a triangular configuration as shown in FIGS. 6 and 7. Arcuate slots 86c of each brake member 86 can be positioned inward of and proximal to a corresponding ball ramp surface 86d. Similarly, each arcuate slot 88a of each brake actuator 88 can be positioned inward of and proximal to a corresponding ball ramp surface 88c. Hooks 92a of retainer 92 are thus located inward of and proximal to the brake ramp surfaces 86d and 88c. This arrangement positions the hooks 92a of the respective retainer 92 close to the ball ramp surfaces 86d, 88c of the respective brake member 86 and brake actuator 88. With this arrangement, the force from the one or more compression springs 94 is located inward of the ball ramp surfaces 86d, 88c and close to these ball ramp surfaces 86d, 88c. This arrangement creates better actuation between the ball ramp surfaces 86d, 88c, and the balls 90 contained therein. Also, the arrangement aids in containing the balls 90 between the respective ball ramp surfaces 86d, 88c. This enhances the performance of the respective brake clutch 70A, 70B in which the arrangement is used. However, hooks 92a of each respective retainer 92 can be located in other positions.

A tab 86e can extend radially from the circumference of each brake member 86, and an arcuate tab slot 86f can be formed in tab 86e. Each brake actuator 88 can have a projection 88d that can extend axially downward through tab slot

86f. The width of projection 88d can be less than the arcuate length of tab slot 86f. As described further below, projection 88d can serve as an abutment and slot 86f can serve as stop. In other embodiments, the abutment can be on respective brake member 86 and the stop can be on the respective brake actuator 88.

Alternatively, other couplings that convert rotary motion to axial motion can be used instead of the ball ramp surface assemblies, such as a cam and follower assembly. Other embodiments can forgo any rotational motion of the brake actuator such a linkage system that provides a linearly displaceable link in contact with the brake member.

Figure 5D:
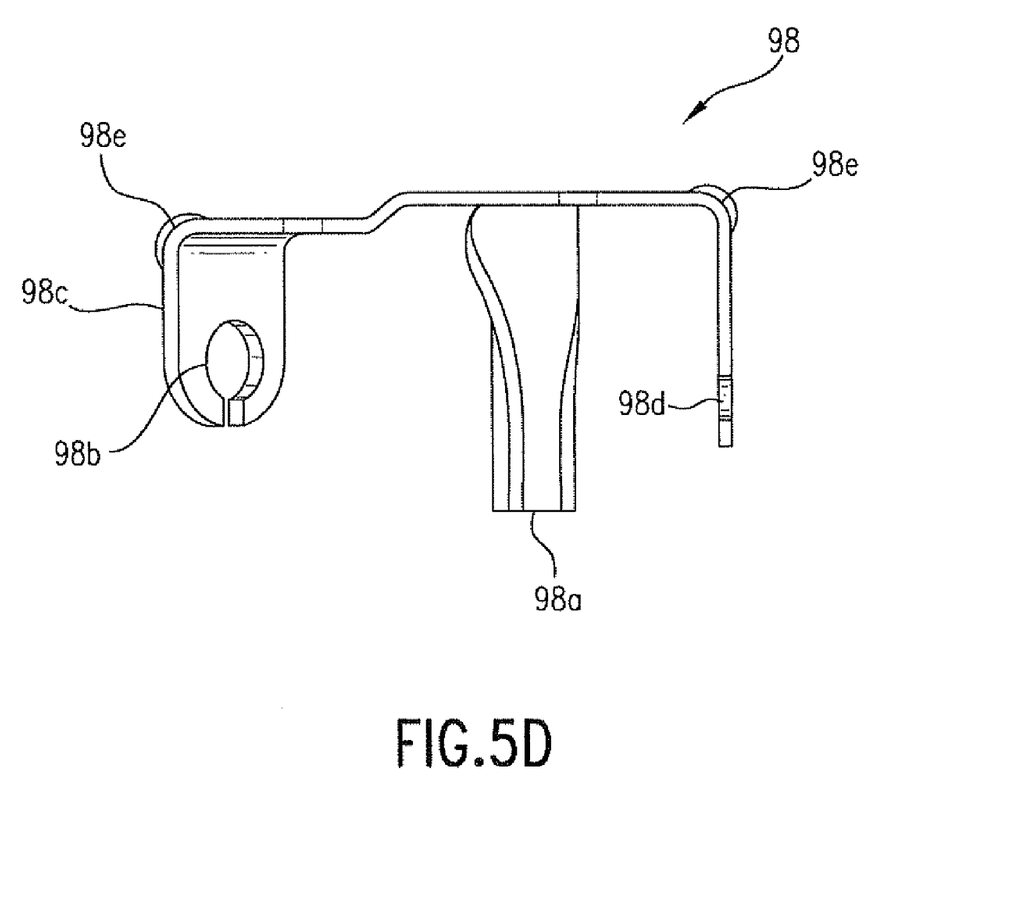
FIG. 5D illustrates a side view of an embodiment of a bracket used in the brake clutch of a drive assembly according to FIG. 1.

Referring to FIGS. 5D, 6 and 7, a bracket 98 can be secured to a bracket tab 86g on each brake member 86 by a post 98a. Post 98a can extend axially downward through an opening 86h in bracket tab 86g of each brake member 86. Brake member 86 is free to move axially along post 98a. Bracket 98 can be secured to a mounting surface, such as a frame or an engine block of snowblower 10, by bolts or other suitable fastenings arrangements. Thus, bracket 98 can rotationally fix brake member 86. Alternatively, brake member 86 can be rotationally secured by a bolt or similar fastening arrangement.

Each bracket 98 can include a guide flange 98c that defines a hole 98b therein. A projection 88e can extend axially upward from the top surface of each brake actuator 88. One end of the associated control cable $CC_R$, $CC_L$ can pass through hole 98b and guide flange 98c and can be secured to projection 88e by way of a slot or a hole or any other similar manner for each brake clutch 70A, 70B. The other end of the respective control cable $CC_R$, $CC_L$ can be secured to the associated brake clutch lever 29A, 29B.

Alternatively, the respective control cable $CC_R$, $CC_L$ can be secured at one end to a hole in brake actuator 88. A coil spring 100 can be secured in each brake clutch 70A, 70B at one end to bracket 98 at a recess 98d. The other end of coil spring 100 can be secured to a spring tab 88f formed at the periphery of the respective brake actuator 88. Recess 98d could be replaced by a hole or aperture in an alternate embodiment. Each bracket 98 can include a plurality of ribs 98e along its body to assist in the support of guide flange 98c and the flange containing recess 98d. However, each bracket 98 does not need to be provided with such ribs.

Each bracket 98 can be a single element providing the functions of rotationally fixing the respective brake member 86, anchoring the respective control cable $CC_R$, $CC_L$, and anchoring the respective coil spring 100. Such an embodiment of bracket 98; therefore, can contribute to the reduction of parts for assembly.

Operation of the each brake clutch of the invention will now be described with references to FIGS. 3-7. FIG. 6 shows a top view of the brake clutch 70A in a disengaged position as shown in the cross-sectional view of FIG. 4B. FIG. 7 shows a top view of brake clutch 70A in an engaged position as shown in the cross-section view of FIG. 4A. Actuation of brake clutch lever 29A actuates control cable $CC_R$ to impart a rotational motion to brake actuator 88. This, in turn, causes each ball ramp surface 88c to move relative to the associated ball 90. Each ball 90 rolls along the opposite inclined ball ramp surface 86d of brake member 86. This motion of the balls 90 forces the brake member 86 axially downward against the bias of compression spring 94 to engage braking surface 86b of brake member 86 with brake surface 82d of friction member 82 as can be seen in FIG. 6. Brake actuator 88 is in the braked position shown in FIG. 6 with the balls 90 rolled toward the narrow portions of inclined ramp surfaces 86d, 88d. At such point, the diameter of the balls 90 push brake member 86 away from brake actuator 88 as shown in FIG. 4B to engage the braking surface 86b of brake member 86 against the brake surface 82d of friction member 82.

Thereby, rotation of the brake actuator 88 by displacement of the control cable $CC_R$ causes the braking surface 86b to axially displace the friction member 82 axially downward toward the driven member 78 against the bias of Belleville spring 84. This downward movement of friction member 82 gradually disengages clutch surface 82c from frusto-conical surface 74a of the drive hub 74. This motion eventually completely disengages driven member 78 from drive hub 74 and drive shaft 32 and retards the rotation of driven member 78. At this point, stopper 78g is engaged by the bottom surface 82b of the friction member. Drive gear 72 associated with driven member 78 of brake clutch 70A thus stops rotation with drive shaft 32.

Consequently, associated gearing 36 stops rotation, which in turn stops associated axle 50 and right wheel 12A from rotating. Since right wheel 12A stops rotation, snowblower 10 with its left wheel 12B still being driven turns to the right. In a similar manner, snowblower 10 would turn to the left, if the brake clutch lever 29B was actuated.

By releasing brake clutch lever 29A, control cable $CC_R$ moves in the opposite direction and rotates brake actuator 88 in the opposite direction, which, in turn, displaces brake member 86 upward from brake surface 82d of friction member 82. This motion gradually disengages the braking surface 86b of brake member 86 from brake surface 82d of friction member 82. This rotation of brake actuator 88 moves it into a disengaged position shown in FIG. 7 with balls 90 rolled toward the wider portions of the inclined ramp surfaces 86d, 88c. At this point, balls 90 permit brake member 86 to move toward brake actuator 88 as shown in FIG. 4A and braking surface 86b of brake member 86 to disengage brake surface 82d of friction member 82.

Simultaneously, the clutch surface 82c is gradually brought into engagement with the frusto-conical surface 74a of drive hub 74 due to the bias of Belleville spring 84. This motion eventually completely engages driven member 78 with drive hub 74 and drive shaft 32 and facilitates the rotation of driven member 78. Thereby, drive gear 72 associated with driven member 78 of brake clutch 70A is again rotated by drive shaft 32. Consequently, associated gearing 36 is rotate, which, in turn, rotates associated axle 50 and right wheel 12A. Since right wheel 12A is rotating, snowblower 10 with its left wheel 12B still being driven returns to a straight forward movement.

Rotation of brake actuator 88 relative to brake member 86 can be limited by the interaction of projection 88e of brake actuator 88 with tab slot 86f of brake member 86. As seen in FIGS. 6 and 7, one end 86i of tab slot 86f defines a first limit of brake actuator 88 and the other end 86j of tab slot 86f defines a second limit of brake actuator 88. When brake actuator 88 is in the first limit position at end 86i as shown in FIG. 6, brake shoe 86a is engaged with brake surface 82d of friction member 82. When brake actuator 88 is in the second limit position at end 84j as shown in FIG. 7, brake shoe 86a is disengaged from brake surface 82d of friction member 82.

The force exerted by coil spring 100 is directed on brake actuator 88 in such a manner as to overcome the bias of compression spring 94. Thus, coil spring 100 biases brake actuator 88 towards the first limit position. This ensures that brake member 86 brakes friction member 82 against rotation until an operator provides input to brake actuator 88 through control cable 100.

In operation, brake clutch levers 29A, 29B can be used control the rotation of respective right and left wheels 12A, 12B through the operations of brake clutches 70A, 70B as described above, independent from one another. This facilitates easier turning of snowblower 10. Thus, by stopping rotation of either wheel 12A, 12B by actuating the associated brake clutch lever 29A, 29B and brake clutch 70A, 70B, snowblower 10 can be turned to the right or the left with ease. Such control can occur whether transmission wheel 34 is located on either side of axis M (forward or reverse) of drive pulley 40 or at any various locations along centerline C (speed).

Embodiments of the present disclosure shown in the drawings and described above are exemplary of numerous embodiments that can be made within the scope of the appending claims. It is contemplated that the configurations described herein can comprise numerous configurations other than those specifically disclosed. The scope of a patent issuing from this disclosure will be defined by these appending claims.

What is claimed is:

1. An independent variable drive assembly for wheels on a snowblower, the drive assembly comprising:
   at least one axle on which a wheel is attached;
   a drive shaft for rotatably driving the axle;
   a transmission system for rotatably driving the drive shaft;
   at least one brake clutch disposed about an end of the shaft, the brake clutch comprising:
      a friction member including an integral brake surface and an integral clutch surface;
      a spring abutting the friction member;
      a brake member proximate to the brake surface;
      the brake member mounted relative to the friction member to permit relative rotation;
      a brake actuator connected to the brake member;
      a drive hub rotatably secured to the shaft, the drive hub configured to rotate with the shaft and configured to contact with the clutch surface of the friction member when the brake member is disengaged;
      a driven member in operable communication with the friction member, such that, when the friction member is rotated, the driven member is also rotated; and
      a drive gear rotatably secured to the driven member, the drive gear configured to transfer rotation from the drive shaft to the axle and wheel; and
   at least one control operably connected to the brake clutch and configured to actuate the brake clutch to stop rotation of the wheel.

2. The drive assembly according to claim 1, further comprising gearing operably engaging the drive gear, the drive gear configured to transfer rotation from the driven member to the gearing which transfers rotation to the axle.

3. The drive assembly according to claim 2, wherein the gearing has a gearing ratio that creates a slower rotation for the at least one wheel as compared to rotation generated by the drive shaft.

4. The drive assembly according to claim 2, further comprising at least one intermediate shaft positioned between the drive shaft and the at least one axle, the gearing being disposed on both the intermediate shaft and the axle.

5. The drive assembly according to claim 1, wherein the friction member comprises an annular disk having an axial surface and an inner circumferential surface, the brake surface being located on the axial surface and the clutch surface being on the inner circumferential surface.

6. The drive assembly according to claim 1, further comprising:
   at least one ball ramp assembly connecting the brake actuator to the brake member; and
   a spring between the brake actuator and the brake member;
   wherein each of the at least one ball ramp assemblies comprises:
      an inclined ball ramp surface on each of the brake member and the brake actuator, wherein each of the ball ramp surfaces on the brake member opposes and is inclined opposite to a corresponding one of the ball ramp surfaces on the brake actuator; and
      a ball between and in contact with each of the opposing ball ramp surfaces.

7. The drive assembly according to claim 6, wherein the brake clutch further comprises a retainer connected to the brake actuator for holding the brake member proximal to the brake actuator.

8. The drive assembly according to claim 1, wherein the transmission system comprises:
   a transmission wheel disposed about the shaft and rotatably movable for rotating the wheel, the transmission wheel having a contact surface; and
   a drive pulley having a drive surface, the drive pulley being rotatable and configured for causing the transmission wheel to rotate when the drive surface and the contact surface of the transmission wheel are in contact.

9. An independent variable drive assembly for wheels on a snowblower, the drive assembly comprising:
   two axles, each axle having a wheel attached;
   a drive shaft for rotatably driving the two axles, the shaft having two ends;
   a transmission system for rotatably driving the drive shaft;
   a pair of brake clutches disposed on opposite ends of the shaft, each brake clutch in communication with an associated axle of the two axles, each brake clutch comprising:
      a friction member including an integral brake surface and an integral clutch surface;
      a spring abutting the friction member;
      a brake member proximate to the brake surface;
      the brake member mounted relative to the friction member to permit relative rotation;
      a brake actuator connected to the brake member;
      a drive hub rotatably secured to the shaft, the drive hub configured to rotate with the shaft and configured to contact with the clutch surface of the friction member when the brake member is disengaged;
      a driven member in operable communication with the friction member, such that, when the friction member is rotated, the driven member is also rotated; and
      a drive gear rotatably secured to the driven member, the drive gear configured to transfer rotation from the drive shaft to the associated axle; and
   two levers, each lever operably connected to one of the two brake clutches and configured to actuate the associated brake clutch to stop rotation of the associated axle to provide independent control to the two wheels.

10. The drive assembly according to claim 9, further comprising a set of gearing operably engaging each drive gear, each drive gear configured to transfer rotation from the associated driven member to the associated gearing which transfers rotation to the associated axle.

11. The drive assembly according to claim 10, wherein each set of gearing has a gearing ratio for creating a slower rotation for the wheel associated therewith as compared to the rotation generated by the drive shaft.

12. The drive assembly according to claim 10, further comprising two intermediate shafts, each intermediate shaft being positioned between the drive shaft and an associated axle of the two axles and each intermediate shaft and axle having an associated set of gearing being disposed thereon.

13. The drive assembly according to claim 9, wherein each friction member comprises an annular disk having an axial surface and an inner circumferential surface, the associated brake surface being located on the axial surface and the associated clutch surface being on the inner circumferential surface.

14. The drive assembly according to claim 9, further comprising:
at least one ball ramp assembly connecting each brake actuator to the associated brake member; and
a spring between each brake actuator and the associated brake member;
wherein each of the at least one ball ramp assemblies comprises:
an inclined ball ramp surface on each of the brake member and the brake actuator, wherein each of the ball ramp surfaces on the brake member opposes and is inclined opposite to a corresponding one of the ball ramp surfaces on the brake actuator; and
a ball between and in contact with each of the opposing ball ramp surfaces.

15. The drive assembly according to claim 14, wherein each brake clutch further comprises a retainer connected to the associated brake actuator for holding the associated brake member proximal to the brake actuator.

16. The drive assembly according to claim 9, wherein the transmission system comprises:
a transmission wheel disposed about the shaft and rotatably movable for rotating the wheel, the transmission wheel having a contact surface; and
a drive pulley having a drive surface, the drive pulley being rotatable and configured for causing the transmission wheel to rotate when the drive surface and the contact surface of the transmission wheel are in contact.

17. A method of providing independent variable drive for wheels on a snowblower, the method comprising:
providing a drive assembly for driving a snowblower comprising:
a drive shaft have two ends;
two wheels disposed on separately rotatable axles;
a transmission system for rotatably driving the drive shaft;
a pair of brake clutches disposed on opposite ends of the shaft, each brake clutch in communication with an associated axle of the two axles, each brake clutch comprising:
a friction member including an integral brake surface and an integral clutch surface;
a spring abutting the friction member;
a brake member proximate to the brake surface;
the brake member mounted relative to the friction member to permit relative rotation;
a brake actuator connected to the brake member;
a drive hub rotatably secured to the shaft, the drive hub configured to rotate with the shaft and configured to contact with the clutch surface of the friction member when the brake member is disengaged;
a driven member in operable communication with the friction member, such that, when the friction member is rotated, the driven member is also rotated;
a drive gear rotatably secured to the driven member, the drive gear configured to transfer rotation from the drive shaft to the associated axle; and
two levers, each lever operably connected to one of the two brake clutches, each lever being configured to actuate the associated brake clutch;
rotatably driving the drive shaft with the transmission system;
rotatably driving the axles with the drive shaft;
engaging each brake clutch such that the drive hub drives the friction member, driven member and gear; and
selectively actuating either of the levers to stop rotation of the associated axle to provide independent control to the two wheels.

18. The method according to claim 17, wherein the transmission system comprises a transmission wheel disposed about the drive shaft and a drive pulley, the transmission wheel having a contact surface and the drive pulley having a drive surface.

19. The method according to claim 18, further comprising rotatably driving the drive pulley and contacting the drive surface of the drive pulley with the contact surface of the transmission wheel to rotatably drive the transmission wheel to drive the drive shaft.

20. The method according to claim 17, wherein the step of selectively actuating either of the levers includes rotating the associated brake actuator to push the associated brake member in contact with the associated friction member, thereby separating the clutch surface of the associated friction member from the associated drive hub.

* * * * *